Patented Jan. 28, 1936

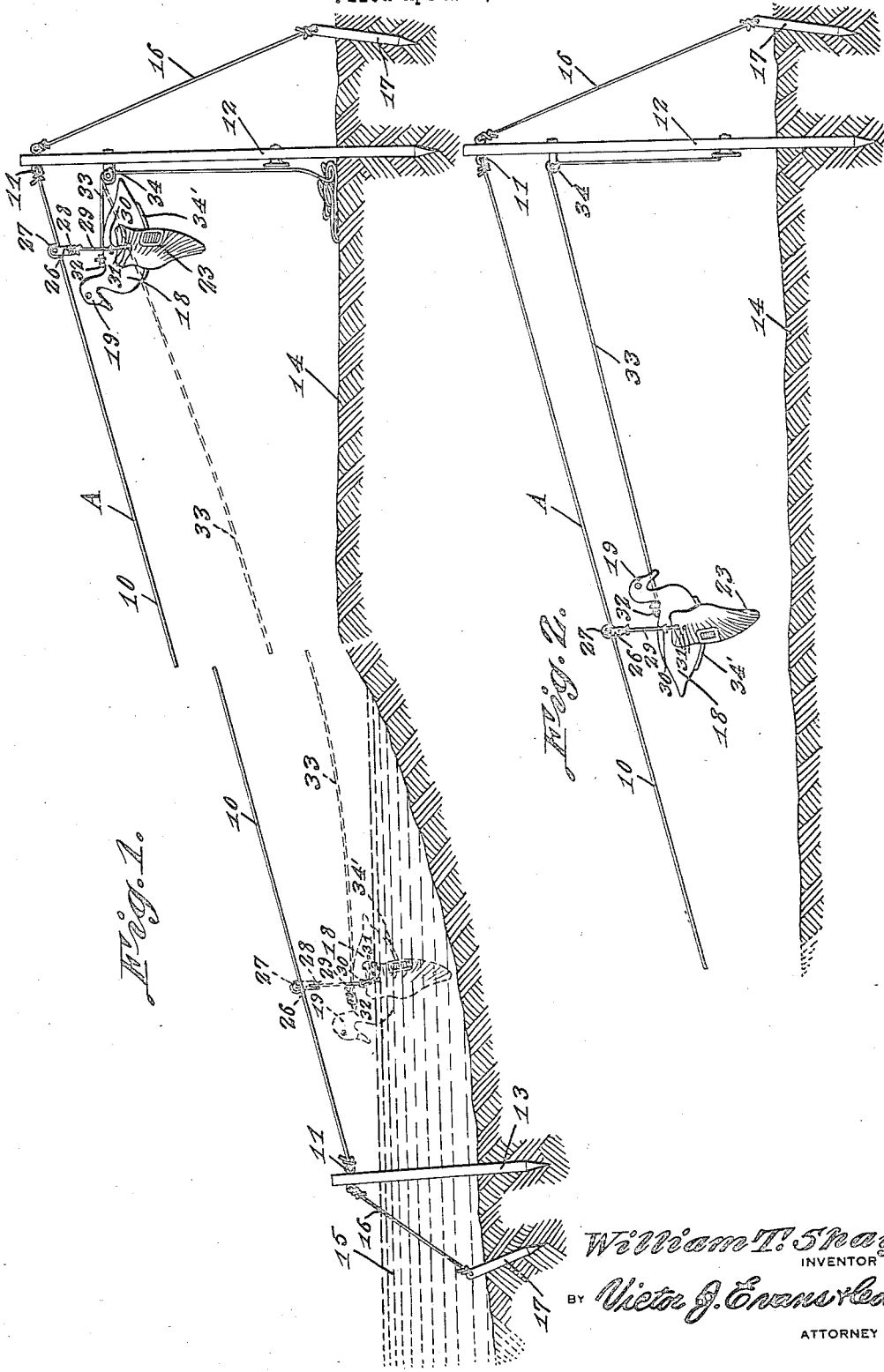

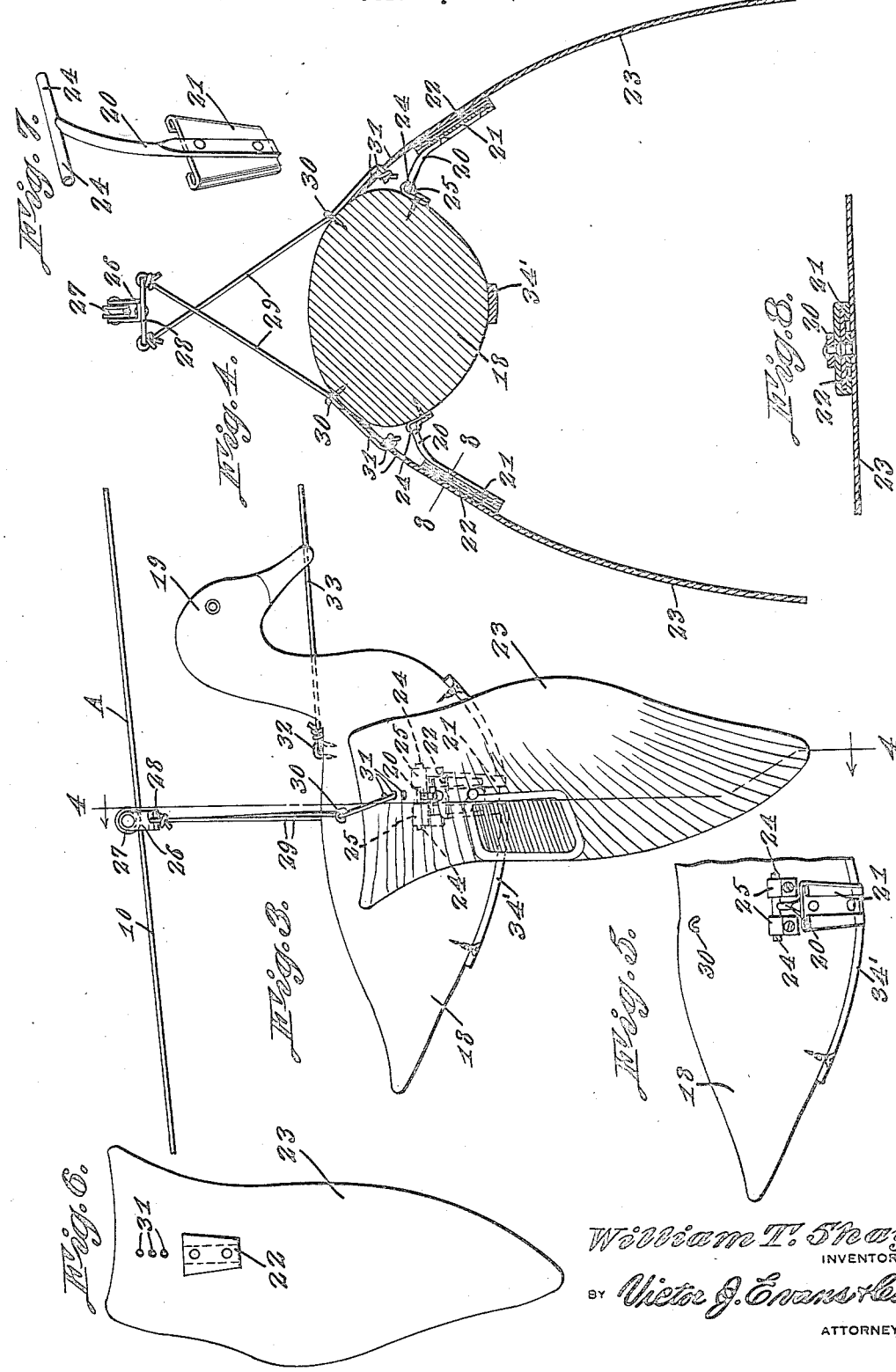

2,028,849

UNITED STATES PATENT OFFICE 2,028,849

FLYING DECOY

William Thomas Shay, Pekin, Ill.

Application April 2, 1935, Serial No. 14,319

1 Claim. (Cl. 43—3)

The invention relates to an animate duck decoy and more especially to a flying decoy.

The primary object of the invention is the provision of a decoy of this character, wherein the same has wings susceptible of flight action so that by suspending the decoy from a trolley line the said decoy will have the appearance of a live duck and the same can be conveniently set on the water or made to leave the water at the option of a hunter, it being always headed in the direction of natural flight and possesses a natural appearance in all positions.

Another object of the invention is the provision of a decoy of this character, wherein the same can be taken apart and carried with other decoys, it being conveniently set up on the water as other decoys and eliminates the handling of a live flier which only gives one flight and creates a disturbance when returning to a blind.

A further object of the invention is the provision of a decoy of this character, which is simple in construction, thoroughly reliable and efficient in its operation, durable, imitative of a natural or live duck and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a pictorial illustration fragmentarily of a body of water and a shore, showing a decoy constructed in accordance with the invention in full lines about to be set in flight and in dotted lines, in floating position.

Figure 2 is a view similar to Figure 1 showing the decoy retrieved or pulled inland.

Figure 3 is an enlarged side elevation of the decoy.

Figure 4 is a sectional view on the line 4—4 of Figure 3 looking in the direction of the arrows.

Figure 5 is a fragmentary side elevation of the body of the decoy.

Figure 6 is a plan view looking toward the inner face of one of the wings of the decoy.

Figure 7 is a perspective view of the hinge link for one of the wings of the decoy.

Figure 8 is a sectional view on the line 8—8 of Figure 4.

Similar reference characters indicate corresponding parts throughout the several views in the drawings.

Referring to the drawings in detail, A designates generally a trolley rigging including a trolley line 10 having its ends detachably secured by eye fasteners 11 to vertical stakes or posts 12 and 13, respectively, these being driven into the soil for anchorage therein, the post 12 being located at shore 14 and the post 13 in the body of water 15. The posts 12 and 13 are set with relation to each other so that the line 10 inclines offshore in direction to the body of water 15 and is of the required height from the surface of the water and the shore surface. These posts or stakes 12 and 13 are held rigid by tie wires or cables 16 and anchoring pins 17, respectively.

Adapted to be suspended from the line 10 of the trolley rigging is the flying decoy which comprises a body 18 and head 19, these being imitative of a natural or live duck and the head having the pose of a natural or live duck eating. At each side of the body 18 is a hinge link 20 carrying a clip 21 of wedge shape for the insertion of a correspondingly shaped cleat 22 fixed to the under side of a wing section 23, this being imitative of the natural wing of a duck species and in extended position for flight action. Each wing 23 is readily separable by disengaging the cleat 22 from the clip 21 of the link 20. The link 20 has its hinge axle 24 journaled in bearings 25 carried by the body 18. Movably fitted upon the trolley line 10 is a carriage 26 having journaled therein the trolley pulley 27 and fitted with a cross bar 28 to which are connected actuator strings 29 at opposite ends thereof. These strings are trained through guide eyes 30 at opposite sides of the body 18 and through selected holes 31 in the inner end of the wings 23 so that by the rise and fall of the body 18 the said wings 23 will automatically operate for flight action or imitate flying activity of a duck. On the body 18 of the decoy at the back thereof and considerably fore of the same is a fastener 32 to which is connected a pull cable or retrieving line 33 the same being trained through a guide pulley 34 upon the stake or post 12 and its free end can be suitably tied to this stake or post. In the delivering of the decoy to the body of water 15 it is to be assumed that the carriage 26 is at the higher point of the trolley line 10 or that position shown in Figure 1 by full lines so that the said trolley when the line 33 is loose will travel in the direction of the lower end of the trolley line 10 to have the decoy settle upon the body of water 15 and during the travel of the carriage the wings 23 of the decoy will have flight action simulating a natural or live duck and the head 19 of the duck will be leading in the direction of flight. Now, when it is desired to retrieve or pull in the decoy from the body of water 15 a user or operator pulls upon the cable or line 33 this causing the decoy to turn with the head 19 facing shore direction and in this turning movement the cords 29 cross each other as shown in Figure 4 of the drawings thus raising the wings 23 and on continued pull upon the line 33 the decoy will be brought shorewise.

The bottom of the body 18 longitudinally thereof at its center carries a weight 34 to assure upright position of the decoy when floating in the water and when in this position, the wings being folded under the body and beneath the water give the appearance of a duck feeding or in resting position.

Of course, it is understood that the body, head and wings of the decoy are suitably painted or otherwise decorated to imitate a natural or live duck.

It is, of course, to be understood that two or more decoys may be used on the same trolley line and same retrieving line and this being effected in any desirable manner consistent with the structural makeup of the invention.

What is claimed is:

A decoy of the character described, comprising a body having a head, wing sections, means swingingly and detachably connecting the wing sections to the body, suspension means connected with the wing sections and adapted to bring the same to flight position, means for removably mounting the suspension means and directing the body to floating position upon the water and means for returning the body to shore and active for changing the position of the body to have the head in flight direction.

WILLIAM THOMAS SHAY.